United States Patent Office 3,425,978
Patented Feb. 4, 1969

3,425,978
NOVEL NEOPRENE LATEX ADHESIVE COMPOSITIONS
Walter B. Armour, Plainfield, N.J., assignor to National Starch and Chemical Corporation, New York, N.Y., a corporation of Delaware
No Drawing. Filed July 23, 1965, Ser. No. 474,486
U.S. Cl. 260—29.3   1 Claim
Int. Cl. C08g 37/20; C09g 3/16

ABSTRACT OF THE DISCLOSURE

A method of preparing an adhesive composition capable of yielding dry films characterized by their heat resistance, said method comprising the steps of first sulfonating a phenolic resin so as to render an aqueous solution of the thus sulfonated resin compatible with a polychloroprene emulsion with which the thus sulfonated phenolic resin is thereafter admixed.

---

This invention relates to a method for the preparation of novel, elastomeric, heat resistant adhesive compositions and more particularly, to the adhesives thus prepared.

Polychloroprene, i.e. neoprene, has long been recognized and used as a base for adhesive compositions which may be in either a latex, i.e. aqueous emulsion, or an organic solvent lacquer form. Although these latter forms of neoprene adhesives may be used with little, if any, modification, it is usually necessary to alter either their physical properties and/or their application characteristics. Thus, various modifiers may be included to increase their tackiness and adhesiveness as well as to minimize their discoloration and deterioration, etc. Typical of such additives are various water dispersed tackifiers which are often admixed with neoprene emulsions to improve the hardness, tackiness, and adhesiveness of the bonds derived therefrom. Despite this potential for improvement and modification, the bonds derived from conventional, unmodified neoprene adhesives still exhibit limited bond strength at elevated temperatures. Needless to say, the latter property, i.e. the ability to retain adhesive characteristics, and especially bond strength at elevated temperatures, is required of those neoprene systems which are to be exposed to such elevated temperatures in ordinary usage. Thus, in various applications involving the automotive, building, and electrical appliance industries, wherein these neoprene adhesives may be used for the bonding of heat insulative, electrical and friction materials as well as various types of metal sheeting it is essential that they be able to retain their adhesive and cohesive strength upon prolonged exposure to elevated temperatures.

Various attempts have been made to overcome this basic deficiency in neoprene adhesive systems. Thus, for example, in the case of neoprene cements, i.e. compositions comprising neoprene solids dissolved in organic solvents such as toluene and methyl ethyl ketone, etc., it has been the practice to admix para alkylated phenolic resins, or reaction products of these phenolic resins with magnesium oxide, together with the cements with the result that the heat resistance of such cements has been greatly improved. Unfortunately, attempts to employ this approach with neoprene latices have not been successful since neoprene in latex form is found to be incompatible with these phenolic resin additives. This incompatibility is believed to be the direct result of the instability of neoprene latices in acidic media. Thus, the presence of the acidic hydroxyl groups in the phenolic resins is sufficient to render the neoprene latices incompatible therewith, so as to result in their gelation upon admixture. When reference is hereafter made to the term "compatibility," the latter term is meant to denote the complete absence of gelation upon the admixture of an aqueous neoprene emulsion and a phenolic resin additive. As may be readily realized, the resolution of this problem is of great significance in that the advantages inherent in the use of neoprene latices, such as their high film strength and toughness, superior film aging properties, ease of handling, high solids contents, reduced loss of costly solvents, and limited fire hazard, etc., would be of great utility in applications wherein elevated temperatures are encountered.

Thus, it is the object of this invention to prepare stable, aqueous neoprene emulsion compositions characterized by their ability to display excellent adhesive and cohesive strength over a wide range of elevated temperatures and which are further characterized by their suitability for diverse applications at such elevated temperatures. Various other objects and advantages of this invention will become apparent to the practitioner from the following detailed description thereof.

The process of the present invention is found to provide smooth, stable, elastomeric adhesive compositions comprising a combination of aqueous neoprene emulsions together with specified sulfonated phenolic resins, the resulting formulations displaying effective heat resistance at temperatures as high as about 230° F. Thus, it has been found that these designated phenolic resins form compatible systems with neoprene emulsions and substantially increase their heat resistance if the latter resins have been sulfonated to within prescribed limits which are dependent on the particular characteristics of the selected phenolic resin. By use of the novel adhesive compositions of this invention, it is now possible for the practitioner to effect the lamination of various substrates rapidly while, nonetheless, developing an outstanding degree of heat resistance in the resulting adhesive bonds.

The use in this specification of the term "percent sulfonation" is meant to indicate the percent, by weight of the phenolic resin, which comprises the sulfonate, i.e. present therein.

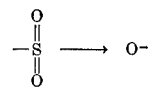

A practical means for determining the minimum degree of sulfonation required by any particular phenolic resin in order to provide a compatible system upon being admixed with an aqueous neoprene emulsion, is to determine the dilutability of the resin with water. The latter procedure comprises preparing an aqueous solution containing 40%, by weight, of sulfonated phenolic resin solids, and if necessary, adjusting the pH level of the resulting solution to a range of from about 9 to 12 by the addition, thereto, of appropriate amounts of an aqueous alkali solution; adding additional amounts of water to the solution; and, thereupon, determining the point at which precipitation of the resin solids first occurs. Adequate sulfonation is indicated, for purposes of this invention, when the aqueous solution containing 40%, by weight, of sulfonated phenolic resin solids tolerates the addition of water in a volume at least equal to its original volume without causing the resin solids to precipitate out of solution. It should be noted that despite dilutability test results indicating the need for only small amounts of sulfonation, in order to provide adequate compatibility, the sulfonated phenolic resins applicable to the process of this invention should contain a minimum of at least about 10% sulfonate groups, as based on the total weight of the sulfonated phenolic resin.

The aqueous neoprene emulsions may be prepared by any of the aqueous emulsion polymerization techniques well known to those skilled in the art. These techniques generally involve the dispersion of monomeric chloroprene, as fine droplets, in water containing an emulsifying agent, such as sodium rosinate, and a free radical type catalyst, such as an organic peroxide, or an inorganic persulfate, etc. Various protective colloids, such as casein, gelatin, and dextrin, etc., may also be included in order to stabilize the resulting emulsion. The reaction conditions of the emulsion polymerization procedure are usually dependent on the particular catalyst and the concentration in which it is used, as well as on the particular polymerization technique which is employed. The resulting neoprene emulsions may contain any total resin solids content which may be desired by the practitioner although practical total resin solids range is from about 40 to 50%, by weight.

For purposes of this invention, when reference is made to the term "phenolic resin," the term is meant to denote those products resulting from the alkaline condensation of formaldehyde with at least one phenol selected from the group consisting of alkyl phenols, alkenyl phenols, alkyl phenols in combination with a maximum of about 20%, by weight, of unsubstituted phenols, and alkenyl phenols in combination with a maximum of about 20%, by weight, of unsubstituted phenols. Thus, the phenol component may correspond to the formula:

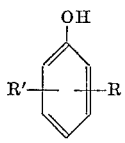

wherein R and R' are radicals selected from the group consisting of hydrogen radicals, alkyl radicals having the structure $C_nH_{2n+1}$, and alkylene radicals having the structure $C_nH_{2n-1}$, wherein $n$ in each of the two latter groups of radicals is an integer having a value of from 3 to 12 inclusive. In addition, no distinction is to be made between A and B-stage phenolic resins; the only requirement being the need for water solubility on the part of the phenolic resin upon its being sulfonated to the required degree. With regard to the relative proportions of formaldehyde and phenol component in the resulting phenolic resins, this ratio should, for the purposes of this invention, be in the range of from about 1.25:1 to 2.50:1 formaldehyde: phenol. Ratios of the latter components which fall well beyond the latter limits, severely impair the resulting compatibility of the blend of the sulfonated phenolic resin with the neoprene emulsion.

The sulfonation of the above described phenolic resins may be accomplished by any of the standard sulfonation techniques well known to those skilled in the art. Thus, for example, U.S. Patent 2,357,798 discloses a method for the preparation of sulfonated phenolic resins which comprises condensing a phenol compound with formaldehyde and reacting the resulting methylol phenol with an inorganic sulfite such as sodium sulfite. In addition, the method taught by U.S. Patent 2,230,641, wherein sulfonated phenolic resins are prepared by condensing phenol sulfonates with formaldehyde, may also be utilized. As noted previously, the sulfonated phenolic resins applicable for use in the process of this invention should contain at least about 10% of sulfonate groups, as based on the total weight of the sulfonated phenolic resin.

In the process of this invention, the sulfonated phenolic resins are utilized in aqueous solutions; the pH level of such solutions being from about 9 to 12. In most instances, the use of sufficient amounts of sodium sulfite in the sulfonation procedure will insure obtaining this requisite pH. It is essential to maintain this pH range because of the previously described pH sensitivity of neoprene emulsions and the instability resulting upon the lowering of their pH levels. In addition, the total solids content of these sulfonated phenolic resin solutions may range from about 30 to 50%, by weight.

In preparing the adhesive compositions of this invention, it is merely necessary to combine, by simple mixing, the aqueous neoprene emulsion together with the aqueous sulfonated phenolic resin solution. No heating or other special treatment is required for this operation. The resulting formulations are found to be extremely stable and may be stored for prolonged periods with no danger of any premature curing or other spoilage.

With regard to proportions, the emulsions comprising the adhesive compositions of this invention may contain from about 10 to 150 parts, by weight, of sulfonated phenolic resin solids per 100 parts, by weight, of neoprene solids. Compositions containing less than 10 parts of sulfonated phenolic resin solids show no appreciable improvement in heat resistance, while those compositions containing in excess of 150 parts of sulfonated resin solids show poor metal adhesion as well as reduced heat resistance. Excellent results have been obtained with adhesive compositions containing approximately a 1:1 weight ratio of sulfonated phenolic resin solids to neoprene solids.

Various additives may be incorporated into the adhesive blends of this invention in order to modify the properties thereof. Among these additives may be included: tackifiers, such as hydrogenated methyl esters of rosin, diethylene glycol esters of rosin, and rosin derived alkyd resins; fillers and pigments, such as talc and titanium dioxide; and, antioxidants, etc. Since the direct addition of these additives to the neoprene latex may cause the coagulation of the neoprene, it is essential that they be added in the form of an aqueous emulsion. It is also essential that these additives do not radically lower the pH level of the adhesive compositions.

In using the adhesive compositions of this invention, they may be applied to substrates by means of a variety of coating techniques. Thus, they may be applied by the use of such mechanical coating implements as a spreader, brush, roller, etc. The adhesive is usually applied to both surfaces which are to be adhered. The thus coated substrates are then dried and bonded by the use of sufficient pressure in combination, in some instances, with heat. The coating weights at which these adhesives are applied will, of course, vary according to the particular formulation and to its specific end use application and may range, for example, from about 5 to 60 pounds per thousand square feet of coated surface.

These adhesive compositions may be coated onto a wide variety of substrates, including cloth, paper, paperboard, metal sheets and foils, rubber, wood and plastic films and sheets, fiber glass, etc. Moreover, these novel adhesive products may be used for the bonding and lamination of any of the above listed substrates.

In the following examples, which further illustrate the embodiment of this invention, all parts given are by weight unless otherwise specified.

Example I

This example illustrates the preparation of an adhesive formulation typical of this invention.

The procedure utilized in preparing the formulation of this example involved the mixing of the following ingredients:

| | Parts |
|---|---|
| Aqueous neoprene emulsion [containing 40%, by wt., resin solids] | 100 |
| Aqueous sulfonated phenolic resin solution [at a pH level of 11 and containing 40%, by wt., of resin solids (sulfonated phenolic resin contained 15%, by wt., sulfonate groups and had a formaldehyde: phenol ratio of 2.0)] | 50 |

The above prepared adhesive formulation showed no evidence of incompatibility even after prolonged standing. It was successfully employed as an adhesive for the bonding of a wide variety of plastic and metal substrates.

In order to illustrate the excellent adhesive properties, at elevated temperature, of the above prepared formulation, its heat resistance was determined using the following test procedure.

The test specimens were prepared by applying three mil (mil=0.001 inch) wet films of the above described adhesive to 1/16 inch thick aluminum panels whose dimensions were 3" x 6". The thus coated aluminum panels were allowed to dry for 30 minutes at room temperature. The coated surfaces of the panels were then positioned in such a manner as to produce an area of overlap which was 3 inches wide x ½ inch long. In order to effectuate the bond, the specimens were placed in a heated press for three minutes where they were exposed to a temperature of 250° F. and a pressure of 100 p.s.i. The panels were allowed to cool to room temperature and were then cut into 1" x 5" strips. The strips were thereafter placed in an Instron Tensile Tester having a heating unit. When the specimens, in the Instron, reached a temperature of 180° F., they were delaminated at a rate of 0.2 inch per minute while the thus determined tensile shear strengths of the adhesive bonds were recorded.

This procedure was utilized to determine the heat resistance of the bonds derived from the above described formulation as well as of the bonds derived from similar specimens which had been adhered with a conventional neoprene latex. The adhesive formulation of this example displayed an average tensile shear strength, at 180° F., of 255 p.s.i. as compared with an average tensile shear strength, at 180° F., of 85 p.s.i. for the conventional neoprene latex. The above results clearly indicate the excellent adhesive performance, at elevated temperatures, on the part of the compositions of this invention.

Example II

This example illustrates the necessity for using sulfonated phenolic resins in the novel adhesive compositions of this invention.

The formulations presented in the following table were prepared by merely mixing the designated ingredients. Each of the three phenolic resins utilized has a formaldehyde:phenol ratio of 2.0.

|  | Parts, Formulation Number | | |
|---|---|---|---|
|  | 1 | 2 | 3 |
| Aqueous neoprene emulsion (as described in Example I, hereinabove) | 100 | 100 | 100 |
| A-stage phenolic resin (aqueous solution containing 40%, by weight, of resin solids) | 50 | | |
| B-stage phenolic resin (isopropanol solution containing 40%, by weight, of resin solids) | | 50 | |
| Aqueous sulfonated phenolic resin solution [at a pH level of 11 and containing 40%, by weight, of resin solids (sulfonated phenolic resin contained 10%, by weight, sulfonate groups and had a formaldehyde:phenol ratio of 2.0)] | | | 50 |

Formulations 1 and 2 gelled immediately upon the addition of the phenolic resin solution to the neoprene latex. Formulation 3, on the other hand, was a completely compatible system. The above results clearly indicate the function served by sulfonating the phenolic resins as well as the necessity for using only these specified sulfonated phenolic resins in the neoprene adhesive compositions of this invention.

Example III

This example illustrates the necessity for maintaining the concentration range for the sulfonated phenolic resin component within the prescribed limits, in the adhesive compositions of this invention, in order to attain formulations which exhibit adhesive and cohesive strength at elevated temperatures.

The formulations presented in the following table were prepared by merely mixing the designated ingredients.

|  | Parts, Formulation Number | | | |
|---|---|---|---|---|
|  | 1 | 2 | 3 | 4 |
| Aqueous neoprene emulsion (as described in Example I, hereinabove) | 100 | 100 | 100 | 100 |
| Aqueous sulfonated phenolic resin solution [at a pH level of 11 and containing 40%, by weight, of resin solids (sulfonated phenolic resin contained 20%, by weight, sulfonate groups and had a formaldehyde:phenol ratio of 1.7)] | 5 | 15 | 150 | 250 |

The results obtained by employing the above described formulations in the test procedure described in Example I, hereinabove, are set forth in the following table:

| Formulation No.: | Shear strength at 180° F. (p.s.i.) |
|---|---|
| 1 | 90 |
| 2 | 150 |
| 3 | 290 |
| 4 | 100 |

It can be readily seen from the results noted in the above table, that a concentration of the sulfonated phenolic resin solids in the range of from about 10 to 150 parts, by weight, per 100 parts, by weight, of neoprene solids provides adhesive compositions which exhibit superior heat resistance characteristics.

Example IV

This example illustrates the high degree of heat resistance exhibited by the bonds derived from the adhesive compositions of this invention. It further illustrates the superiority of these novel products when compared with: (1) conventional neoprene emulsions, and (2) blends of neoprene emulsions with varied rosin tackifiers; the latter group of blends being representative of formulations presently being used to improve heat resistance of aqueous neoprene emulsions.

The various adhesive formulations are set forth in the following table:

|  | Parts, Formulation Number | | | | | |
|---|---|---|---|---|---|---|
|  | 1 | 2 | 3 | 4 | 5 | 6 |
| Aqueous neoprene emulsion (as described in Example I, hereinabove) | 100 | 100 | 100 | 100 | 100 | 100 |
| Aqueous sulfonated phenolic resin solution (as described in Example I, hereinabove) | | | | 50 | 100 | |
| Gum rosin emulsion (40%, by weight, solids) | | | | | 50 | |
| Rosin glyceride emulsion (40%, by weight, solids) | | | | | | 50 |
| Alkaline, modified rosin emulsion (40%, by weight, solids) | | | | | | 50 |

The results obtained by employing the above described formulations in the test procedure described in Example I, hereinabove, are set forth in the following table:

| Formulation No.: | Shear strength at 180° F. (p.s.i.) |
|---|---|
| 1 | 85 |
| 2 | 255 |
| 3 | 320 |
| 4 | 60 |
| 5 | 65 |
| 6 | 64 |

It can readily be seen from the results noted in the above table, that the adhesive compositions of this invention produced adhesive bonds which were vastly superior in heat resistance to the other formulations tested.

Summarizing, this invention is thus seen to provide novel adhesive compositions comprising blends of aqueous neoprene emulsions and aqueous sulfonated phenolic resin solutions, which are capable of yielding bonds exhibiting excellent heat resistance. Variations may, of course, be made in procedures, proportions, and materials without departing from the scope of this invention which is limited only by the following claim.

What is claimed is:

1. The method of preparing an adhesive composition capable of yielding dry films characterized by their heat resistance, said method comprising the steps of:
   (a) sulfonating a phenolic resin so that it contains a minimum of about 10% of sulfonate groups, based on the total weight of the sulfonated phenolic resin so as to render an aqueous solution of the thus sulfonated phenolic resin compatible with aqueous polychloroprene emulsions; and,
   (b) admixing an aqueous solution of the thus sulfonated phenolic resin with an aqueous polychloroprene emulsion wherein said phenol component of said sulfonated phenolic resin is at least one phenol selected from the group consisting of alkyl phenols, alkenyl phenols, alkyl phenols in combination with a maximum of about 20%, by weight, of unsubstituted phenols, and alkenyl phenols in combination with a maximum of about 20%, by weight, of unsubstituted phenols; said phenol component corresponding to the formula:

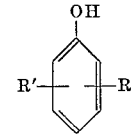

wherein R and R' are radicals selected from the group consisting of hydrogen radicals, alkyl radicals having the structure $C_nH_{2n+1}$ and alkylene radicals having the structure $C_nH_{2n-1}$, wherein $n$ in each of the two latter groups of radicals is an integer having a value of 3 to 12 inclusive; wherein the weight ratio of formaldehyde to phenol in said sulfonated phenolic resin is from about 1.25:1 to 2.50:1; wherein said aqueous sulfonated phenolic resin solution is at a pH level of from about 9 to 12 and wherein it is present in a concentration of about 10 to 150 parts, by weight, per 100 parts, by weight, of polychloroprene solids.

References Cited
UNITED STATES PATENTS

| 2,481,879 | 9/1949 | Ross | 260—29.3 |
| 2,564,291 | 8/1951 | Wolf | 260—29.3 |
| 2,918,442 | 12/1959 | Gerrard et al. | 260—29.3 |
| 3,219,607 | 11/1965 | Perronin | 260—29.3 |
| 3,328,354 | 6/1967 | Dietrick | 260—29.3 |

MURRAY TILLMAN, *Primary Examiner.*

JOHN C. BLEUTGE, *Assistant Examiner.*

U.S. Cl. X.R.

156—333, 335; 161—215, 198, 262, 264; 260—845